US008572372B2

(12) United States Patent
Varriale et al.

(10) Patent No.: US 8,572,372 B2
(45) Date of Patent: Oct. 29, 2013

(54) METHOD FOR SELECTIVELY ENABLING ACCESS TO FILE SYSTEMS OF MOBILE TERMINALS

(75) Inventors: Anronio Varriale, Turin (IT); Laura Colazzo, Turin (IT); Alberto Bianco, Turin (IT); Maura Turolla, Turin (IT)

(73) Assignee: Telecom Italia S.p.A., Milan (IT)

( * ) Notice: Subject to any disclaimer, the term of this patent is extended or adjusted under 35 U.S.C. 154(b) by 1057 days.

(21) Appl. No.: 12/083,838

(22) PCT Filed: Oct. 18, 2005

(86) PCT No.: PCT/EP2005/011194
§ 371 (c)(1),
(2), (4) Date: Oct. 7, 2009

(87) PCT Pub. No.: WO2007/045257
PCT Pub. Date: Apr. 26, 2007

(65) Prior Publication Data
US 2010/0037047 A1 Feb. 11, 2010

(51) Int. Cl.
*H04L 29/06* (2006.01)
(52) U.S. Cl.
USPC ........... 713/165; 713/153; 713/160; 713/161; 713/166; 713/171; 709/202; 709/218; 709/219; 709/229; 726/2; 726/26; 726/27; 726/28; 726/29; 726/30; 380/33; 380/247; 380/255; 380/277; 380/281
(58) Field of Classification Search
USPC ........................................................ 713/165
See application file for complete search history.

(56) References Cited

U.S. PATENT DOCUMENTS

| 5,987,123 | A | 11/1999 | Scott et al. |
| 6,678,828 | B1 * | 1/2004 | Zhang et al. ............. 726/2 |
| 6,889,210 | B1 | 5/2005 | Vainstein |
| 7,260,555 | B2 * | 8/2007 | Rossmann et al. ........ 705/51 |
| 2002/0188736 | A1 * | 12/2002 | Jarvensivu ............... 709/229 |
| 2004/0054894 | A1 | 3/2004 | Lambert |
| 2006/0020659 | A1 * | 1/2006 | Cricco et al. ............. 709/203 |

FOREIGN PATENT DOCUMENTS

| EP | 1 320 011 A2 | 6/2003 |
| EP | 1 513 040 A1 | 3/2005 |
| WO | WO 2004/010304 A1 | 1/2004 |
| WO | WO 2004/036350 A3 | 4/2004 |
| WO | WO 2005/064430 A1 | 7/2005 |

* cited by examiner

*Primary Examiner* — Nathan Flynn
*Assistant Examiner* — Bryan Wright
(74) *Attorney, Agent, or Firm* — Finnegan, Henderson, Farabow, Garrett & Dunner, L.L.P.

(57) ABSTRACT

Users of mobile terminals in a communication network are provided controlled access to files in a file system through the steps of configuring the files as a file body containing a file content and a file header containing content profile information; providing a security identity module and a secure agent; storing in the security identity module user profile information identifying a set of content profiles allowed for access to the file system; extracting, via the secure agent, the content profile information from the headers of the files; retrieving, via the secure agent, the user profile information stored in the security identity module; checking the user profile information and the content profile information; and providing the user with access to those files in the file system for which the user profile information and the content profile information are found to match.

23 Claims, 2 Drawing Sheets

US 8,572,372 B2

METHOD FOR SELECTIVELY ENABLING ACCESS TO FILE SYSTEMS OF MOBILE TERMINALS

CROSS REFERENCE TO RELATED APPLICATION

This application is a national phase application based on PCT/EP2005/011194, filed Oct. 18, 2005, the content of which is incorporated herein by reference.

FIELD OF THE INVENTION

The invention relates to techniques for controlling access to file systems. The invention was developed with specific attention paid to its possible application in user terminals for mobile communication networks that provide contents and services.

DESCRIPTION OF THE RELATED ART

File systems of mobile terminals for use in present-day mobile communications networks (developed primarily in view of voice services) do not ensure file confidentiality, authenticity and integrity; this applies both to mobile operator files and to user files. Data and applications stored in the file system of a mobile terminal are thus physically accessible, for instance, via a simple PC connection. In fact, information and data transfer is simplified when the mobile terminal user stores his personal data in a memory card.

Equipment such as personal computers may be configured to provide file confidentiality, authenticity and integrity based on passwords, Smart Cards or other authentication means. Most of these solutions are DRM-oriented (DRM being an acronym for Digital Rights Management). Exemplary of these prior art arrangements is the arrangement disclosed in US-A-2004054894. This arrangement aims at stopping Operating System (OS) services that would enable unauthorized access to DRM-protected content.

Other solutions do permit ciphering of personal data by means of an external password stored, by example, on a Smart Card, but do not permit secure distribution of contents to third parties. For instance, U.S. Pat. No. 5,987,123 discloses a file system that validates an entity attempting access to a file before allowing the entity to perform file operations. A method and apparatus are disclosed that allow a computer system to trust both program and data files without the intervention of the user. This arrangement is based on two levels of validation for programs and data: the former level specifies sources that the user has identified as trustworthy and not trustworthy; the latter level specifies sources that the system itself considers trustworthy and not trustworthy. Data are acceptable when both levels yield positive results in a check process based on an affidavit verification mechanism. Applicants remark that this approach does not guarantee data confidentiality and the user cannot distribute secure contents to third parties.

Still other solutions are generally related to network infrastructure devices that support access to remotely stored data (see e.g. WO-A-2004/010304), or refer to a server architecture (see e.g. WO-A-2004/036350).

Solutions also exist that can be based on secure storage devices, like a SIM (Security Identity Module), as in EP-A-1 513 040: this document discloses an arrangement where external licenses are verified by the SIM, but the user cannot generate new licenses to distribute contents to third parties.

OBJECT AND SUMMARY OF THE INVENTION

The preceding discussion indicates that the need exists for arrangements that may selectively enable (i.e. control) access to the file systems of mobile terminals—such as e.g. terminals of mobile communication networks—by simultaneously fulfilling the basic following requirements:
 ensuring file confidentiality, authenticity and integrity,
 permitting secure distribution of contents to third parties, by allowing trusted contents to be created and distributed to third parties without having to enclose a respective license for each content distributed.

The object of the invention is to provide a satisfactory response to that need.

According to the present invention, that object is achieved by means of a method having the features set forth in the claims that follow. The invention also relates to a corresponding system, a SIM card for use therein as well as a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the arrangement described herein is thus a method of providing at least one user of a mobile terminal in a communication network with controlled access to files in a file system, the method comprising the steps of:
 configuring the files in said file system as a file body containing a file content and a file header containing content profile information identifying said file content,
 providing in said mobile terminal a security identity module and a secure agent,
 storing in said security identity module user profile information identifying a set of content profiles allowed for access to said file system by said at least one user,
 extracting, via said secure agent, said content profile information from the headers of the files in said file system,
 retrieving, via said secure agent, said user profile information stored in said security identity module,
 checking said user profile information and said content profile information for a possible match, and
 providing said at least one user with access to those files in said file system for which said user profile information and said content profile information are found to match.

Essentially, the preferred embodiment of the invention gives rise to a "trusted" file system. This implements a virtual trusted layer that makes the physical file system in a mobile terminal or a memory card truly secure. This arrangement ensures protection of files created by users and third parties, by means of dynamic management of user profiles stored in a SIM, by enabling the access to a single file or to distribution channels (file classes).

The preferred embodiment of the invention ensures privacy of user data and protection of mobile operator and third parties files. User privacy is guaranteed in that the personal files stored in the "trusted" file system are not accessible by other people as these people do not own a valid user profile within the SIM Card and, possibly, are not in possession of the right PIN number. By using such a trusted file system, a mobile network operator can manage in a dynamic way accesses to his own resources and services. Similarly, a third party content provider can deliver his own contents in a secure and transparent way, with a flexible mechanism that allows creation of single content delivery, thematic channel distribution or user communities.

BRIEF DESCRIPTION OF THE ANNEXED DRAWINGS

The invention will now be described, by way of example only, with reference to the enclosed figures of drawing, wherein.

DETAILED DESCRIPTION OF PREFERRED EMBODIMENTS OF THE INVENTION

Figure 1:
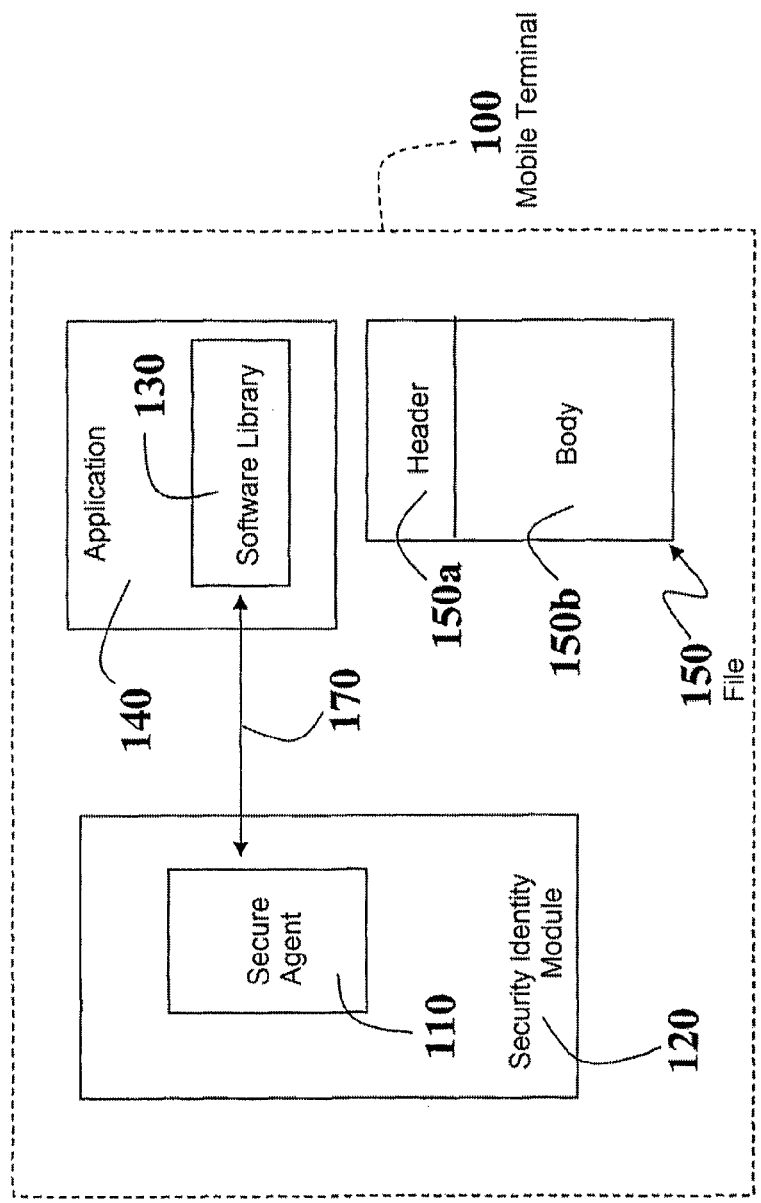
FIG. 1 is a functional block diagram of a file system access arrangement as described herein.

A basic feature of the "trusted" file system arrangement described herein is a transparent virtual layer interposed between a trusted application layer and the original file system layer of a mobile terminal 100, as schematically shown in FIG. 1.

Access to the files 150 stored in the trusted file system is managed by a secure agent 110, a security identity module 120, and a software library 130.

The secure agent 110 is a software application running in the security identity module 120. Agent 110 is "secure" in that it resides into a module, the security identity module 120, whose access is strictly controlled, for example by means of password/encryption. The security identity module 120 can be for example the SIM card (Subscriber Identity Module) of the mobile terminal or, in case the terminal is not provided with a SIM, a secure repository of subscriber identity information, such as a Smart Card either removable or embedded into the terminal.

Preferably, the software library 130, providing a set of functions for the associated application, will be included in trusted applications 140 running on the mobile terminal 100. Alternatively, the software library 130 may be shared by a plurality of trusted applications as a dynamic library residing in the operating system of the terminal 100.

Each file 150 in the trusted file system considered is comprised of two parts, namely a header 150a and a body 150b. In general, the files of the trusted file system are stored in a memory of the mobile terminal, either a memory physically resident on the terminal or a memory residing on a peripheral of the same terminal (e.g. a memory card inserted in the terminal or a Bluetooth peripheral provided with storage capacity, such as a Personal Computer).

The header 150a contains a random identifier RI and a Content Profile CP. The Content Profile is ciphered and signed by means of a Service Key KS.

The body 150b contains an Encrypted Content EC ciphered by means of a Content Key KC.

The Service Key KS is produced by means of a secret, preferably non-invertible, function F of a Master Key MK, stored in the security identity module (in this embodiment the SIM card of the terminal) 120, and the Random Identifier RI generated at file-creation time: KS=F(MK, RI) Exemplary of such a secret function is a customized symmetric ciphering algorithm based on AES or 3-DES.

The Secure Agent 110 is aware of the secret Function F and is thus able to decipher the Content Profile CP by reading the Random Identifier RI from the header 150a.

The Content Profile CP contains the content features required in order to characterize the content, for example in terms of content identifier, and the content key KC. Preferably the Content Profile CP contains type, class, content identifier, release date, user pin, the content key KC and content issuer information. Other content features can be used in order to characterize particular classes of contents. In particular, the issuer information allows verifying the content authenticity.

The SIM card 120 contains the User Profile UP information that describes the user "privileges" related to the access to the trusted file system: in other words the User Profile UP identifies all the types of file contents that are allowed for access by a given user.

Secure communication between the SIM 120 and the software library 130 is based on a trusted channel 170 generated by means of methods to create secure sessions. Exemplary of these methods are cryptographic techniques based on the Diffie-Hellmann algorithm and variations thereof.

When a trusted application 140 tries to access some existing trusted file through the software library 130, the content header 150a is transferred to the secure agent 110, which extracts the content profile CP after calculating the service key KS.

After receiving the content profile CP, the secure agent 110 retrieves the user privileges, stored in the user profile UP, and starts the matching operation. After successful verifications, the secure agent sends the content key KC to the software library 130 by means of a trusted channel 170 and the trusted application is able to request read and write operations. In the other cases an error code is generated.

When a trusted application 140 tries to create a new trusted file through the software library 130, then a respective content header 150a is created according to the preferred content profile CP and a random content key KC.

The content header, once created, is sent to the secure agent 110. After receiving the header, the secure agent generates the random identifier RI, completes the content profile CP with additional information (e.g.: issuer information, etc.) and encrypts the header by means of the service key KS, calculated as described above.

The encrypted header is sent to the software library 130 by means of a trusted channel 170. The software library 130 is now ready to fill the new trusted file by using the content key KC.

The encrypted content 150b includes a final hash string, which can be used by the software library 130 to check the integrity of the trusted file.

The user profile UP is managed by the mobile operator, who can remove/add new policy lines at each user subscription/unsubscription. The user profile has at least one policy line, which is the issuer information stored as a unique identifier number of the user. This line is used when new trusted files are created and it is stored in the content profile CP as content identifier ID associated to the class "local" and to the type "document". In that way, the trusted file can be read at least by the user (profile) that generated it.

Figure 3:
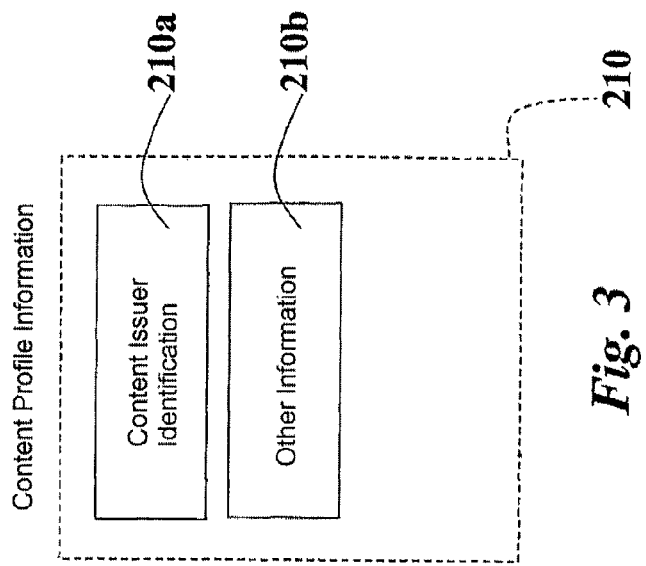
FIG. 3 shows a content profile for use in the arrangement described herein.
Figure 2:
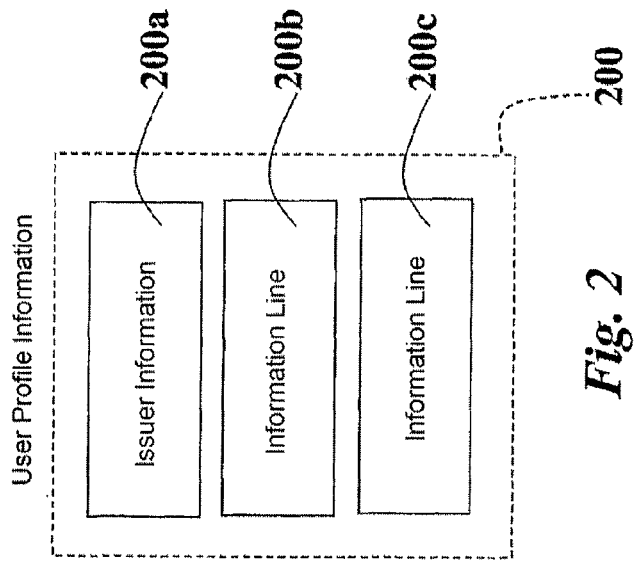
FIG. 2 shows an example of a user profile for use in such an arrangement.

FIGS. 2 and 3 show examples of a user profile 200 and a content profile 210, respectively. The first line of the user profile contains the issuer information 200a, which is a unique number stored on the SIM 120 at building time.

The following lines (200b, 200c, etc.) are added by the mobile operator at each user subscription, in order to manage contents generated by third parties.

The content profile 210 is managed by the content issuer (generator); it contains the content issuer identification 210a and other information 210b about the content features such as the type (music, video, data, etc.), the class (local, event, channel, etc.), the content identifier ID (associated to each class), the release date, etc.

The information items 210b may include a user PIN for use in providing additional security as better described in the following.

The secure agent 110 searches in the user profile 200 a grant line corresponding to the content profile 210 and verifies the user credentials.

In general, the trusted files can be generated in a local mode (i.e. on-board the mobile terminal) or in a remote mode (e.g. from an external system).

The local mode is suitable to protect personal files (photos, audios, videos, texts, office data, and so on), such as those created by the user. Users of the arrangement described herein can thus create new trusted files by means of a content profile that binds the trusted file to their own SIM (with a user PIN, if necessary). This is possible by using the first line of the user profile, as described above, to generate a local class content profile.

When the secure agent 110 checks the user profile information 200 and the content profile information 210 for a possible match (in this case the match is made between the unique identifier number of the user and the content identifier)—in order to provide access to the file(s) for which the user profile information and the content profile information are found to match—the secure agent 110 may locate a user PIN possibly included in the content profile and require the user to input such a PIN into the terminal 100 as a prerequisite to allow access to the file or files in question.

The remote mode is suitable when trusted contents are generated to be communicated to one or several users. This is useful, for instance, when the mobile operator has to delivery new selective services or when content providers want to delivery protected contents, that is in typical DRM scenarios.

Unlike common delivery solutions, where individual content items are generated with related protected license files, the trusted file system arrangement described herein allows each content item to be generated according to the method described. It will be appreciated that such a content item can be generated without a related license.

An exemplary use of the remote mode is when the operator wants to delivery a selective update of subscribed services. Any user that is already a subscriber to a given service already has in his SIM a user profile line that enables access to the service contents.

The line can exhibit a format such as e.g. TYPE: Data, CLASS: Channel, ID: MO12345678, FROM: 1 Jan. 2006, TO: 31 Dec. 2006.

This line indicates that the user in question can access all the trusted contents of the mobile operator (MO) with a specific ID (12345678) over a given period such as e.g. January to December 2006.

The operator generates the service update as a new trusted content with specific content profile that allows the secure agent to match the described user profile line.

The content profile will contain at least the issuer information and other descriptions similar to the user profile line, such as TYPE: Data, CLASS: Channel, ID: MO12345678, DATE: 18 Apr. 2006.

The software library 130 includes an interface made up of standard file system access APIs (Application Programming Interfaces) and, in addition, a set of integrity checking functions.

The following is an example of a minimal set of functions: CREATE, OPEN, READ, WRITE, SEEK, SIZE, CHECK, CLOSE.

The CREATE function is used when new local trusted files are generated or third parties create new remote trusted files. As described above, this function must be provided with the content profile required to create the content header passed on to the function as an argument and, if necessary, with a user PIN in order to protect the content when the mobile terminal (within the enabled SIM 120) is not in the owner's hands. The CREATE function thus generates the content key (KC), in order to allow the WRITE function to fill the trusted file, and returns the trusted file ID that will be used as the argument for other functions to specify what trusted file should be accessed. If no argument is passed on to the function, a local trusted file is generated and it is accessible only by the owner SIM.

The OPEN function is used when an existing trusted file should be accessed. As described above, the function checks the user profile policies and, after retrieving the content key KC, it returns the trusted file ID enabling the use of the other functions. If the check operation is not successful, then the trusted file ID is not returned and the other functions are not enabled. If necessary, a user pin can be passed to the function.

The READ/WRITE functions are enabled only after successful OPEN or CREATE operations. These functions allow accessing the trusted file in a transparent way decoding or encoding the content.

The SEEK function is enabled only after successful OPEN or CREATE operations. This function allows moving the internal logical file pointer. The logical file pointer is the pointer of the original content while the physical file pointer is the pointer of the current trusted content.

The SIZE function is enabled only after successful OPEN or CREATE operations. This function retrieves the logical size of the content. The logical size is the original content size while the physical size is the current trusted content size (with header and hash code).

The CHECK function is enabled only after successful OPEN or CREATE operations. This function executes the integrity check of the trusted content and returns the issuer information. This is useful to guarantee the integrity and the authenticity of the content before using it at application level.

The CLOSE function is enabled only after successful OPEN or CREATE operations. This function destroys the trusted content key (KC) and deletes the trusted file ID in the software library 130.

All the described APIs are reserved and only trusted applications 140 can use the software library 130.

The arrangement described herein (i.e. trusted File System technology) can be used to ensure application integrity and authenticity. In particular a mobile operator can use such an arrangement to trust his own services implementations.

In fact, each time an application accesses a database or a resource file associated with a certain configuration file, the security identity module 120 will enable file access only if the user possesses the correct rights. In that way, protection of the contents conveyed by the configuration file is provided already at the level of such databases and/or resource files.

The software library 130 is useful also for mobile terminal management, in terms of trusted upgrade delivery and can support any kind of DRM arrangement for copyrighted content distribution: for instance, the trusted file system arrangement described herein may be used i.a. for distributing DRM licenses.

The trusted file arrangement described herein thus makes it possible for the user to lock personal data files (address book, messages, photos).

Without prejudice to the underlying principles of the invention, the details and the embodiments may vary, even appreciably, with reference to what has been described by way of example only, without departing from the scope of the invention as defined by the annexed claims.

The invention claimed is:

1. A method of providing at least one user of a mobile terminal in a communication network with controlled access to files in a file system, comprising the steps of: configuring the files in said file system as a file body containing a file content and a file header containing content profile information identifying said file content, wherein said content profile information is ciphered; providing in said mobile terminal a security identity module and a secure agent; storing in said security identity module user profile information identifying a set of content profiles allowed for access to said file system by said at least one user; extracting, via said secure agent, said content profile information from the headers of the files in said file system; retrieving, via said secure agent, said user profile information stored in said security identity module; checking said user profile information and said content profile information for a possible match; providing said at least one user with access to the files in said file system for which said user profile information and said content profile information are found to match; including in said header a random identifier generated at the time of creation of the respective file in said file system; generating a service key as a secret function of said random identifier and a master key stored in said security identity module; and signing said ciphered content profile information in said file header by means of said service key.

2. The method of claim 1, comprising the step of arranging said secure agent into said security identity module.

3. The method of claim 1, wherein said security identity module is a security identity module card associated with said mobile terminal.

4. The method of claim 1, comprising the step of making said secure agent aware of said secret function, whereby said secure agent is able to decipher said content profile information by reading said random identifier from said header.

5. The method of claim 4, comprising the steps of: transferring said file header to said secure agent; and said secure agent calculating said service key and extracting from said file header said content profile information.

6. The method of claim 1, comprising the step of including in said content profile information items characterizing said file content as a function of at least one entity selected from: type, class, content identifier, release date, user pin, and content issuer.

7. A method of providing at least one user of a mobile terminal in a communication network with controlled access to files in a file system, comprising the steps of: configuring the files in said file system as a file body containing a file content and a file header containing content profile information identifying said file content; providing in said mobile terminal a security identity module and a secure agent; storing in said security identity module user profile information identifying a set of content profiles allowed for access to said file system by said at least one user; extracting, via said secure agent, said content profile information from the headers of the files in said file system; retrieving, via said secure agent, said user profile information stored in said security identity module; checking said user profile information and said content profile information for a possible match; providing said at least one user with access to the files in said file system for which said user profile information and said content profile information are found to match, wherein said file content in said file body is ciphered by means of a content key, comprising the steps of: running at least one trusted application on said mobile terminal; providing a software library comprising a set of functions for said at least one trusted application; and causing said secure agent, as a result of said step of checking, to send said content key to said software library, thereby enabling said at least one trusted application to access said file system.

8. The method of claim 7, comprising the step of providing secure communication between said security identity module and said software library via a trusted channel.

9. A method of providing at least one user of a mobile terminal in a communication network with controlled access to files in a file system, comprising the steps of: configuring the files in said file system as a file body containing a file content and a file header containing content profile information identifying said file content; providing in said mobile terminal a security identity module and a secure agent; storing in said security identity module user profile information identifying a set of content profiles allowed for access to said file system by said at least one user; extracting, via said secure agent, said content profile information from the headers of the files in said file system; retrieving, via said secure agent, said user profile information stored in said security identity module; checking said user profile information and said content profile information for a possible match; and providing said at least one user with access to the files in said file system for which said user profile information and said content profile information are found to match, wherein the method further comprises causing at least one trusted application to create a new trusted file in said file system by the steps of: providing a software library comprising a set of functions for said at least one trusted application; creating a respective file header for said new trusted file as a function of given content profile information; sending said respective file header to said secure agent for ciphering; and said secure agent sending said ciphered respective file header to said software library, whereby said software library is enabled to fill file contents into said new trusted file.

10. The method of claim 9, comprising the step of providing secure communication between said secure agent and said software library via a trusted channel.

11. The method of claim 9, comprising the step of creating said respective content header as a function of a random content key.

12. The method of claim 11, comprising the step of said software library filling file contents into said new trusted file by using said content key.

13. The method of claim 1, comprising the steps of: including in said user profile information, information identifying the issuer of newly created files in said file system; and including said issuer information in said content profile information, whereby said newly created files can be accessed by the issuer thereof.

14. The method of claim 1, comprising the steps of: including in said content profile information a user PIN, and providing said at least one user with access to at least one corresponding file in said file system subservient to said at least one user entering matching PIN information into the terminal.

15. A system for providing at least one user of a mobile terminal in a communication network with controlled access to files in a file system by means of the method of claim 1, comprising: a security identity module configured for storing user profile information identifying a set of content profiles allowed for access to said file system by said at least one user; and a secure agent configured for: extracting said content profile information from the headers of the files in said file system; retrieving said user profile information stored in said security identity module; and checking said user profile information and said content profile information for a possible match, whereby said at least one user is provided access to the files in said system for which said user profile information and said content profile information are found to match.

16. The system of claim 15, wherein said secure agent is arranged into said security identity module and said security identity module is a security identity module card associated with said mobile terminal.

17. The system of claim 15, wherein said secure agent is configured for deciphering ciphered content profile information from the headers of the files in said file system.

18. The system of claim 17, wherein said secure agent is configured for having said file headers transferred thereto and extracting from said file headers said content profile information.

19. The system of claim 15, comprising a software library comprising a set of functions for at least one trusted application run on said mobile terminal.

20. The system of claim 19, comprising a trusted channel to provide secure communication between said software library and at least one of said security identity module and said secure agent.

21. The system of claim 19, comprising said secure agent configured for sending, as a result of said step of checking, a content key to said software library, thereby enabling said at least one trusted application to access said file system.

22. A security identity module card having stored therein said security identity module and said secure agent of the system of claim 15.

23. A non-transitory, computer-readable medium comprising instructions configured to cause a computer to perform computer program product loadable in the memory of at least one computer and comprising software code portions capable of performing the method of claim 1.

* * * * *

UNITED STATES PATENT AND TRADEMARK OFFICE
CERTIFICATE OF CORRECTION

PATENT NO. : 8,572,372 B2
APPLICATION NO. : 12/083838
DATED : October 29, 2013
INVENTOR(S) : Antonio Varriale et al.

It is certified that error appears in the above-identified patent and that said Letters Patent is hereby corrected as shown below:

On the Title page, item 75 (inventors), line 1, "Anronio Varriale" should read -- Antonio Varriale --.

In the Claims

Claim 23, col. 10, lines 17-20, "to cause a computer to perform computer program product loadable in the memory of at least one computer and comprising software code portions capable of performing the method of claim 1." should read -- to cause a computer to perform the method of claim 1. --.

Signed and Sealed this
Twentieth Day of May, 2014

Michelle K. Lee
*Deputy Director of the United States Patent and Trademark Office*